United States Patent [19]

Omdoll, Jr.

[11] 3,718,359
[45] Feb. 27, 1973

[54] GAFF HOOK

[76] Inventor: James W. Omdoll, Jr., P.O. Box 93, Palmyra, Wis.

[22] Filed: Nov. 30, 1970

[21] Appl. No.: 93,580

[52] U.S. Cl. ................................................294/26
[51] Int. Cl. ..............................................B65g 7/12
[58] Field of Search..........294/26, 61, 66, 79, 110 A; 43/5, 6

[56] References Cited

UNITED STATES PATENTS

| | | | |
|---|---|---|---|
| 2,527,133 | 10/1950 | Johnson et al. | 294/110 A |
| 1,818,474 | 8/1931 | Gough | 7/14.3 |
| 2,590,595 | 3/1952 | Ziebell | 294/26 |
| 2,184,216 | 12/1939 | Gross | 294/26 |
| 1,534,954 | 4/1925 | Holtz | 294/110 A |

Primary Examiner—Evon C. Blunk
Assistant Examiner—Johnny D. Cherry
Attorney—Andrus, Sceales, Starke & Sawall

[57] ABSTRACT

A gaff hook including a pair of tines with the tines having generally straight shanks which are secured together and mounted within a hollow sealed handle. The outer end of each tine is curved and terminates in a pointed tip. The curved ends of the tines lie in a common plane and the radius of curvature of one tine is different from that of the other tine so that the pointed tips are in spaced parallel relation, which enables the tips to easily penetrate into the fish and yet provides stability to prevent twisting of the fish on the gaff hook.

2 Claims, 3 Drawing Figures

PATENTED FEB 27 1973 3,718,359

INVENTOR.
James W. Omdoll, JR
BY
Andrus, Scales, Starke & Sawall
Attorneys

GAFF HOOK

This invention relates to an improved gaff hook for fishing.

Gaff hooks are used in fishing for gaffing large sized fish to facilitate landing of the fish. Various types of gaff hooks have been employed in the past with the most common type having a single curved end which terminates in a sharpened point to penetrate the fish. This single-tine gaff hook has disadvantages in that the fish can freely twist on the tine with the result that occassionally the fish will twist completely off of the tine and be lost. Other commonly used gaff hooks have multiple tines which provide greater stability and prevent twisting of the fish, while other gaff hooks are provided with barbed tines. However, the gaff hooks of the prior art, generally, have been rather clumsy, expensive, or when barbs were used, did extensive damage to the fish on removal.

The present invention is directed to an improved gaff hook which includes a pair of coplaner tines. The tines are provided with generally straight shanks which are secured together and mounted in sealed relation in a hollow handle. The outer end of each tine is curved and terminates in a needle-point tip. The curved ends of the tine lie in a common plane and the radius of curvature of one tine is substantially different from that of the other tine so that the point tips are located in generally parallel spaced relation. The double coplaner tines provide better stability for holding the fish and prevent the fish from twisting. The tines are produced from heat treated metal which provides a certain degree of resiliency, and this resiliency is important in providing greater stability in that the outer tine having the larger radius of curvature will initially penetrate the fish, and due to its resilient nature will deflect outwardly away from the inner tine. After penetration, the resiliency will urge the outer tine toward the inner tine to aid in holding the fish on the gaff hook.

As a further advantage, the handle is hollow and is sealed to the shanks of the tines, thereby enabling the gaff hook to float. This feature prevents loss of the gaff hook in the event that the gaff hook is accidentally dropped into the water.

Other objects and advantages will appear in the course of the following description.

The drawings illustrate the best mode presently contemplated of carrying out the invention.

Figure 1:
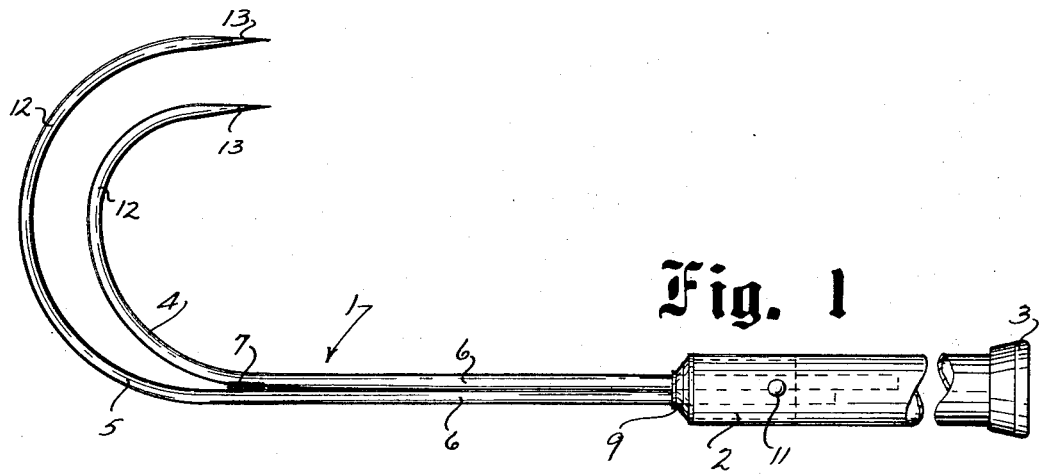
FIG. 1 is a plan view of the gaff hook of the invention.
Figure 3:
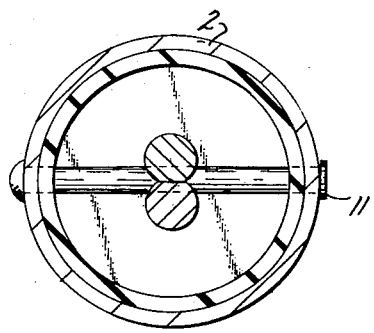
FIG. 3 is a transverse section taken along line 3—3 of FIG. 1.

The drawings illustrate a gaff hook 1 including a hollow tubular handle 2. The outer end of the tubular handle 2 is enclosed and sealed by a plastic, or rubber-like, cap 3, and a pair of tines 4 and 5 extend outwardly from the opposite end of the handle.

Each of the times 4 and 5 is provided with a generally straight shank 6 and the shanks of the tines are secured together by welds 7. While the drawings illustrate the shanks 6 being connected together by the welds 7, it is contemplated that other fastening means can be employed to secure the shanks in parallel engagement.

The shanks 6 extend through an opening 8 formed in a plastic plug 9 which is secured within the end of the handle 2. Opening 8 in the plug 9 is elongated in shape and smaller in size than the cross section of the shanks 6, so that when the shanks are inserted with the opening 8 a fluid-tight seal is provided between the shanks and the plug 9. As the opposite end of the handle is enclosed by the cap 3, the handle is thus water-tight which enables he unit to float in the water.

Figure 2:
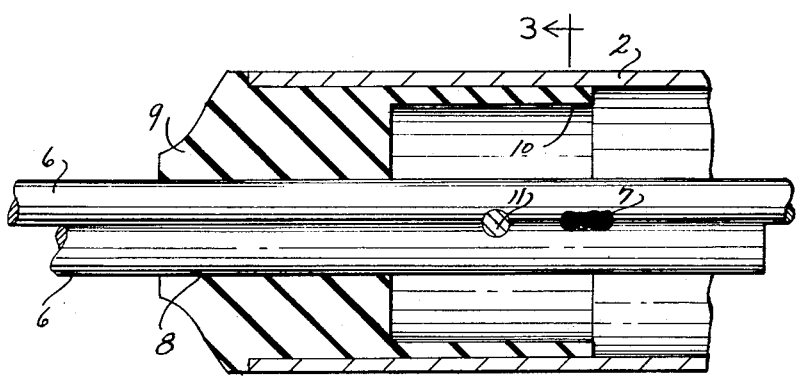
FIG. 2 is an enlarged longitudinal section showing attachment of the shanks of the tines to the handle.

To secure the shanks within the tubular handle 2, the inner end of the plug 9 is provided with a recess 10 and a rivet 11 extends through aligned openings in the handle 2, the will of the plug bordering the recess 10 and the tines 6. The connection provided by the rivet 11 not only prevents the shank 6 from being withdrawn from longitudinally from the handle, but also prevents relative rotation between the shanks and the handle. The weld 7 shown in FIG. 2 prevent the rivet 11 from being pulled out from between the shank 6.

In addition to serving as the seal for the end of the handle 2, the plug 9 serves a further function in that it provides reinforcement for the end of the tubular handle 2.

As best illustrated in FIG. 1, the outer end of each of the tines 4 and 5 is provided with a curved end 12, which terminates in a needle point or sharpened tip 13. The curved ends 12 lie in a common plane and the radius of curvature of the curved end 12 of the inner tine 4 is substantially less than the radius of curvature of the curved portion of the outer tine 5. This results in the tips 13 being in spaced parallel relation and pointing in a direction generally parallel to the axis of the shanks 6.

The sharpened tips 13 provide easy penetration into the fish and the double tine construction provides better stability for holding the fish and preventing twisting of the fish on the gaff hook. The tines 4 and 5 are preferably formed of heat treated steel which can be zinc or cadmium plated for increased corrosion. Due to its heat treated condition the tines have a degree of resiliency which is important in providing improved stability for the gaff hook. When a fish is gaffed, the tip 13 of the outer tine 5 will initially engage the fish. As the tine 5 has a greater radius of curvature than the tine 4, and will deflect in a direction away from the inner tine 4. After penetration, the resiliency will tend to urge the outer tine 5 back toward its original position, and this action will tend to clamp the tines against the portion of the fish located between the tines and thereby provide a more secure hold on the fish.

As the handle is water tight, the gaff hook will float if accidentally dropped in the water. Due to the weight of the metal tines, the gaff hook will float vertically with the end of the handle projecting above the water when it can be readily grasped and retrieved.

While the drawings show the gaff hook formed with two tines 4 and 5, it is contemplated that more than two tines can be used, with the outer ends of the tines having different radii of curvature so that the tips of the tines will be generally parallel spaced relation.

Various modes of carrying out the invention are contemplated as being within the scope of the following claims which particularly point out and distinctly claim the subject matter which is regarded as the invention.

I claim:

1. A gaff hook, comprising a plurality of tines with each tine having a generally straight shank and a generally curved end terminating in a sharpened tip, means for attaching the shanks together in generally parallel contiguous relationship, the curved ends of the tines lying in a common plane and the radius of curvature of the curved end of a first of said tines being substantially greater than the radius of curvature of the curved end of the second of the tines, whereby the tips of the tines are disposed in spaced relation, a hollow tubular handle, the attached shanks of the tines being disposed within the hollow handle, a first end of the handle being closed and said attached shanks projecting from the second end of the handle, a resilient plug disposed within the second end of the handle and having an opening to complement and receive the attached shanks in sealed relation whereby said handle is watertight, and fastening means extending generally transversely through the wall of the handle and engaged with said attached shanks for preventing displacement of said attached shanks from the handle.

2. The gaff hook of claim 1, wherein said fastening means extends through a hole formed in the attached shanks at the joint between the shanks, said means for attaching the shanks together comprise a series of welds spaced along the length of the shanks with at least one of said welds being located between the first end of the handle and said fastening means.

* * * * *